(12) United States Patent
Radhakrishnan et al.

(10) Patent No.: US 10,848,582 B2
(45) Date of Patent: *Nov. 24, 2020

(54) CUSTOMIZABLE EVENT-TRIGGERED COMPUTATION AT EDGE LOCATIONS

(71) Applicant: Amazon Technologies, Inc., Seattle, WA (US)

(72) Inventors: Manigandan Radhakrishnan, Seattle, WA (US); Oleksii Zakharenko, Redmond, WA (US); Craig Wesley Howard, Seattle, WA (US); Venkatesh Vijayaraghavan, Redmond, WA (US); Shubham Katiyar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/852,256

(22) Filed: Sep. 11, 2015

(65) Prior Publication Data

US 2017/0078433 A1 Mar. 16, 2017

(51) Int. Cl.
*H04L 29/08* (2006.01)
*H04L 29/06* (2006.01)

(52) U.S. Cl.
CPC .......... *H04L 67/2842* (2013.01); *H04L 67/42* (2013.01)

(58) Field of Classification Search
CPC ......... H04L 29/06027; H04L 29/06462; H04L 29/06; H04L 29/06523; H04L 29/08072; H04L 29/0809; H04L 29/08117; H04L 29/08135; H04L 29/08648; H04L 29/08981; G06Q 30/02

USPC ......................................................... 709/231
See application file for complete search history.

(56) References Cited

U.S. PATENT DOCUMENTS

| | | | |
|---|---|---|---|
| 8,271,793 | B2 | 9/2012 | Swildens et al. |
| 8,489,731 | B2 | 7/2013 | Gagliardi et al. |
| 8,516,193 | B1 | 8/2013 | Clinton et al. |
| 8,583,769 | B1 | 11/2013 | Peters et al. |
| 8,626,876 | B1 | 1/2014 | Kokal et al. |

(Continued)

FOREIGN PATENT DOCUMENTS

WO 2015052355 4/2015

OTHER PUBLICATIONS

International Search Report and Written Opinion from PCT/US2016/050969, dated Nov. 11, 2016, Amazon Technologies, Inc., pp. 1-13.

(Continued)

*Primary Examiner* — Mahran Y Abu Roumi
(74) *Attorney, Agent, or Firm* — Robert C. Kowert; Kowert, Hood, Munyon, Rankin & Goetzel, P.C.

(57) ABSTRACT

Methods, systems, and computer-readable media for customizable event-triggered computation at edge locations are disclosed. A request for content is received at an edge server from a client device. The content is sought from a content cache at the edge server or from an origin server coupled to the edge server. Processing of the request is initiated, comprising encountering an event. The event is associated with a function specified by a customer. The function associated with the event is executed at the edge server using process isolation. The content is generated based at least in part on execution of the function. The content is sent from the edge server to the client device.

20 Claims, 9 Drawing Sheets

(56) References Cited

U.S. PATENT DOCUMENTS

| | | |
|---|---|---|
| 9,060,031 B1 | 6/2015 | Taylor et al. |
| 9,332,084 B2 | 5/2016 | Kim et al. |
| 9,900,397 B1 | 2/2018 | Cope et al. |
| 2002/0065899 A1* | 5/2002 | Smith ............... G06F 17/30893 709/214 |
| 2003/0115421 A1 | 6/2003 | McHenry et al. |
| 2003/0135509 A1 | 7/2003 | Davis et al. |
| 2004/0003032 A1* | 1/2004 | Ma ..................... G06F 17/3089 709/203 |
| 2004/0010621 A1 | 1/2004 | Afergan et al. |
| 2004/0064832 A1 | 4/2004 | Tsukidate et al. |
| 2004/0133538 A1 | 7/2004 | Amiri et al. |
| 2004/0205162 A1 | 10/2004 | Parikh |
| 2005/0005000 A1 | 1/2005 | Yoshimoto |
| 2005/0204280 A1 | 9/2005 | Eves et al. |
| 2007/0156845 A1 | 7/2007 | Devanneaux et al. |
| 2009/0150518 A1 | 6/2009 | Lewin et al. |
| 2009/0164550 A1* | 6/2009 | Rahrer ................. H04L 41/046 709/202 |
| 2010/0223491 A1* | 9/2010 | Ladd ................... G06F 11/2268 714/2 |
| 2011/0282997 A1 | 11/2011 | Prince et al. |
| 2012/0041970 A1* | 2/2012 | Ghosh ................ G06F 17/30902 707/769 |
| 2012/0096106 A1 | 4/2012 | Blumofe et al. |
| 2012/0096546 A1 | 4/2012 | Dilley et al. |
| 2012/0198043 A1 | 8/2012 | Hesketh et al. |
| 2013/0046883 A1* | 2/2013 | Lientz ................. H04L 41/0816 709/224 |
| 2013/0159472 A1* | 6/2013 | Newton .............. H04L 41/0856 709/219 |
| 2013/0159473 A1 | 6/2013 | Newton et al. |
| 2013/0167193 A1 | 6/2013 | Brookins et al. |
| 2013/0198718 A1* | 8/2013 | Kunze ....................... G06F 8/61 717/121 |
| 2014/0082126 A1 | 3/2014 | Kim et al. |
| 2014/0108671 A1* | 4/2014 | Watson ............... H04L 65/4084 709/231 |
| 2014/0173064 A1 | 6/2014 | Newton et al. |
| 2014/0181266 A1 | 6/2014 | Joch et al. |
| 2014/0181268 A1 | 6/2014 | Stevens et al. |
| 2014/0280479 A1 | 9/2014 | Kazerani et al. |
| 2014/0280480 A1 | 9/2014 | Kazerani et al. |
| 2014/0313542 A1 | 10/2014 | Benchorin et al. |
| 2015/0021661 A1 | 1/2015 | Chen et al. |
| 2015/0180733 A1 | 6/2015 | Krutzler et al. |
| 2015/0229733 A1 | 8/2015 | Yang et al. |
| 2015/0324867 A1 | 11/2015 | Jalili |
| 2016/0182454 A1 | 6/2016 | Phonsa et al. |
| 2016/0228805 A1 | 8/2016 | Bar-Lev et al. |
| 2016/0323606 A1 | 11/2016 | Mao et al. |
| 2017/0034237 A1* | 2/2017 | Silver ................... H04L 65/604 |
| 2017/0078433 A1 | 3/2017 | Radhakrishnan et al. |
| 2017/0078434 A1 | 3/2017 | Radhakrishnan et al. |
| 2017/0109797 A1 | 4/2017 | Boffa et al. |
| 2017/0116607 A1 | 4/2017 | Leighton |
| 2017/0236160 A1 | 8/2017 | Oberoi et al. |
| 2018/0020082 A1 | 1/2018 | Stevens et al. |
| 2018/0034930 A1 | 2/2018 | Stevens et al. |
| 2018/0041544 A1 | 2/2018 | Brookins et al. |

OTHER PUBLICATIONS

U.S. Appl. No. 14/852,272, filed Sep. 11, 2015, Radhakrishnan, et al.

Office Action from Australian Patent Application No. 2016319754, dated Sep. 11, 2015, (Amazon Technologies Inc.), pp. 1-4.

Examination Report from Australian Application No. 2016319754, (Amazon Technologies, Inc.), pp. 1-3, dated Nov. 13, 2018.

Oiffice Action from Chinese Application No. 201680051436.0, (Chinese version and English translation), dated Apr. 14, 2020, pp. 1-21.

Extended European Search Report from Application No. 20183475. 1-1213, dated Aug. 17, 2020, pp. 1-11.

* cited by examiner

CUSTOMIZABLE EVENT-TRIGGERED COMPUTATION AT EDGE LOCATIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

For example, content delivery networks or content distribution networks (CDNs) may employ distributed systems across different geographical locations to deliver content to end users in an efficient manner. A CDN may provide various types of content such as web pages and their constituent elements, streaming media, downloadable media, application data, and so on. The goals of a CDN may include high availability and low latency for delivery of content. The distributed system that implements a CDN may include remote points of presence in many geographical locations, often over multiple backbones, so that content can be served to disparate users with high performance. These remote points of presence may be termed edge locations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for customizable event-triggered computation at edge locations are described. Using the techniques described herein, customers of a content delivery network (CDN) may supply, select, or otherwise configure functions associated with various types of content delivery events. The functions and their associations with events may be propagated to edge servers in the CDN. When an appropriate request is received at an edge server, the associated function may be executed at the edge server. By executing the function, the edge server may modify a request for content from a cache at the edge server, modify a request for content from an origin server, modify a response to a request for content from the cache at the edge server, modify a response to a request for content from the origin server, modify a request teardown to generate metrics or log entries, or generate an error associated with the request. The function may be executed using techniques for process isolation in a secure execution environment. In one embodiment, a read-only data store may be propagated to edge servers. The read-only data store may be customer-specific and may be supplied and/or modified by a particular customer for use in generating and/or delivering content to clients on behalf of that customer. In processing a request for content, an edge server may execute a function (such as a customer-specified function) that utilizes elements of data retrieved from the data store. In this manner, the generation and/or delivery of content to users from edge locations may be customized.

Figure 1:
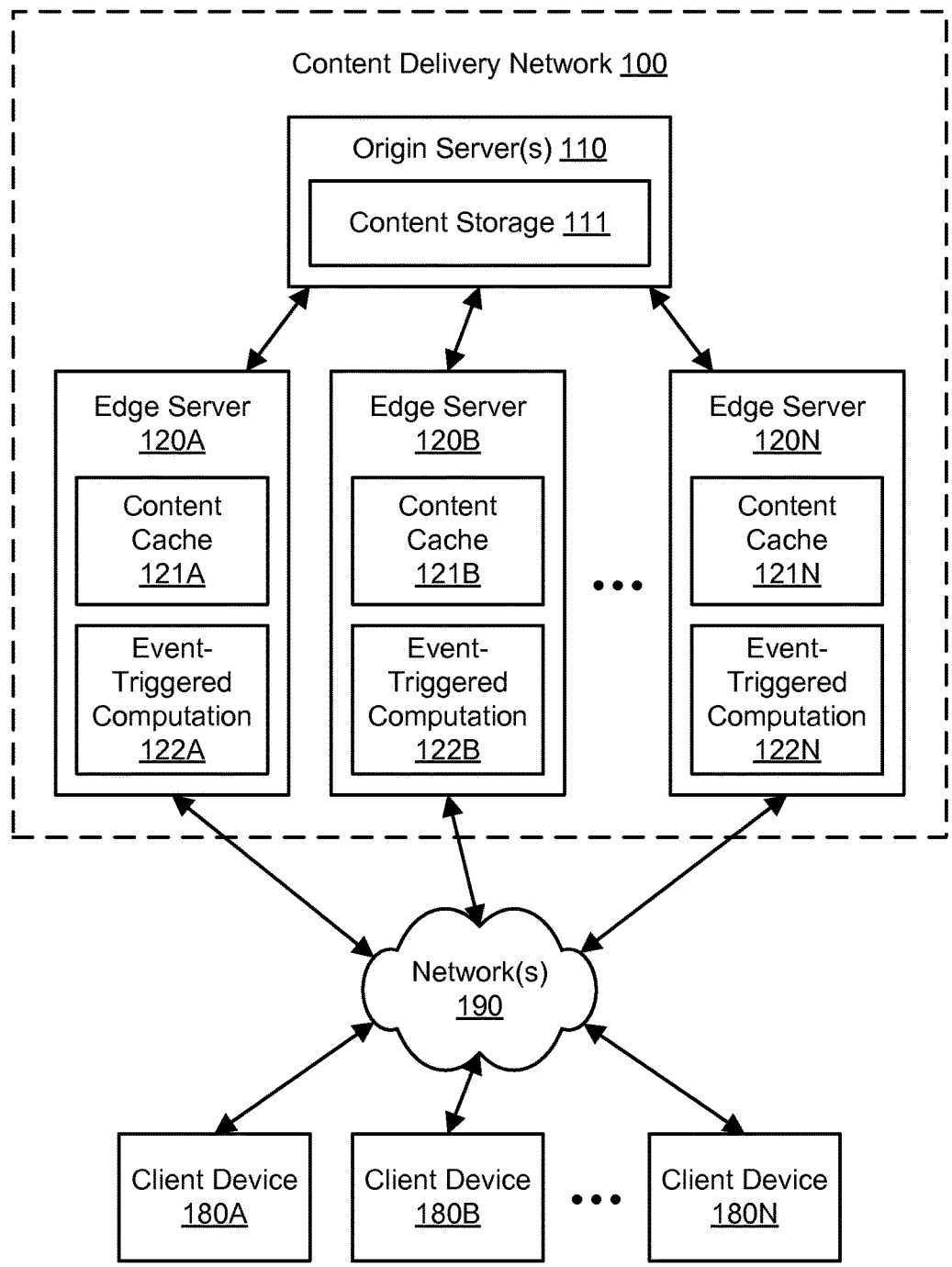
FIG. 1 illustrates an example system environment for customizable event-triggered computation at edge locations, according to one embodiment.

FIG. 1 illustrates an example system environment for customizable event-triggered computation at edge locations, according to one embodiment. A content delivery network (CDN) 100 may include multiple computing devices that interact to deliver content to client devices 180A-180N over one or more networks 190. The CDN 100 may provide various types of content such as web pages and their constituent elements, streaming media, downloadable media, application data, program code intended for execution at client devices, and so on. In one embodiment, the CDN 100 may include one or more origin servers 110 and a plurality of edge servers 120A-120N. The origin servers(s) 110 may persistently store elements of content in content storage 111 and may also generate content dynamically, e.g., based on elements of content in the content storage 111. The edge servers 120A-120N may cache elements of content originally obtained from the origin server(s) 110. Accordingly, each of the edge servers 120A-120N may include a content cache, such as content cache 121A for edge server 120A, content cache 121B for edge server 120B, and content cache 121N for edge server 120N.

In one embodiment, clients seeking content from the CDN 100 may interact primarily with the edge servers 120A-120N rather than with the origin server(s) 110. When processing requests for content from client devices 180A-180N, the edge servers 120A-120N may first attempt to deliver content from their local content caches; if the content is not cached locally, the edge servers may obtain the requested content from the origin server(s) 110. The content caches 121A-121N may implement caching policies such that elements of content may expire and be removed from the caches (e.g., if the elements of content have not been requested by clients within a configurable period of time). However, elements of content may not necessarily expire from the content storage 111 of the origin server(s) 110. Any suitable storage technologies may be used to implement the content storage 111 and/or content caches 121A-121N.

The origin server(s) 110 may be more centrally located (e.g., within particular regions) than the edge servers 120A-120N. As used herein, the term "edge server" generally refers to a content server at an edge location, and the term "edge location" generally refers to a location (in terms of geography and/or network topology) that is closer to end users according to some metric. As used herein, the term "origin server" generally refers to a content server that supplies content to one or more edge servers. The edge servers 120A-120N may be distributed in a variety of geographical locations or locations in a network topology that may be termed edge locations. The edge servers 120A-120N may be positioned in disparate locations so that they can provide content to client devices 180A-180N in various locations with generally higher performance than the origin server(s) 110. In one embodiment, the higher performance of content delivery using the edge servers 120A-120N may be measured in terms of network latency, network bandwidth usage, page load times, and/or any other suitable metric(s). For example, for a particular request for content, a particular client device may be routed to a particular edge server in a manner than minimizes network latency or otherwise maximizes performance, such as by reducing a number of network hops between the client device and the selected edge server. The use of the edge servers 120A-120N to deliver content may also provide higher availability and/or lower cost.

By implementing customizable event-triggered computation, the edge servers 120A-120N may execute customer-specified or user-specified functions at any suitable event during the processing of content requests from client devices 180A-180N. For example, the customer-specified functions may modify content requests from clients, modify responses to content requests, modify origin requests to the origin server(s), modify responses to origin requests to the origin server(s), modify error notifications (e.g., to clients, when requested content cannot be delivered), and/or generate metrics and/or log entries after processing a content request. In one embodiment, the customizable event-driven computation may use a read-only data store replicated to the edge servers 120A-120N in order to generate and/or deliver content to the client devices 180A-180N. Each of the edge servers 120A-120N may include one or more modules, components, or other elements of functionality that implement customizable event-triggered computation. For example, each edge server 120A-120N may include a functionality for event-triggered computation, such as event-triggered computation functionality 122A at edge server 120A, event-triggered computation functionality 122B at edge server 120B, and event-triggered computation functionality 122N at edge server 120N.

The CDN 100 and the client devices 180A-180N may be communicatively coupled to one another using one or more suitable networks, such as network(s) 190. The client devices 180A-180N may represent or correspond to various clients or users. The client devices 180A-180N may be distributed over any suitable locations or regions. In one embodiment, the client devices 180A-180N may be configured to run browser programs or other applications that consume content from the CDN 100. For example, the client devices 180A-180N may run web browsers that generate HTTP (HyperText Transport Protocol) requests for content from the CDN 100. Each of the client devices 180A-180N may be implemented using one or more computing devices, any of which may be implemented by the example computing device 3000 illustrated in FIG. 9.

Figure 9:
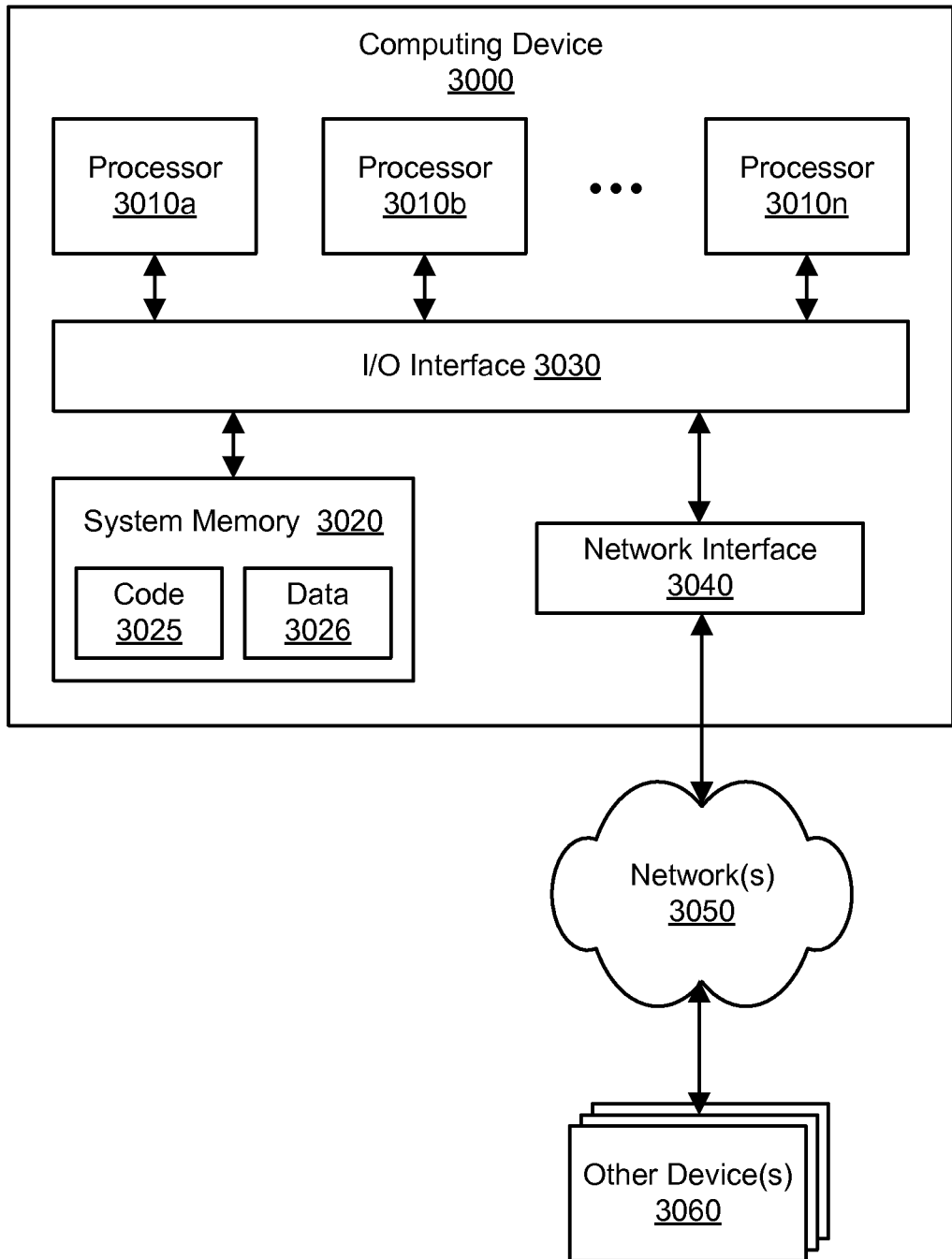
FIG. 9 illustrates an example computing device that may be used in some embodiments.

The CDN 100 may include a plurality of computing devices, any of which may be implemented by the example computing device 3000 illustrated in FIG. 9. In various embodiments, portions of the functionality of the CDN 100 may be provided by the same computing device or by any suitable number of different computing devices. In one embodiment, portions of the functionality described herein for an edge server may be distributed across a plurality of computing devices and/or storage resources. For example, the content cache 121A and event-triggered computation 122A may be implemented using different computing devices that are coupled using a network or other interconnect. If any of the components of the CDN 100 are implemented using different computing devices, then the components and their respective computing devices may be communicatively coupled, e.g., via a network. Each of the illustrated components (such as the content storage 111, content caches 121A-121N, and event-triggered computation 122A-122N) may represent any combination of software and hardware usable to perform their respective functions.

It is contemplated that the CDN 100 may include additional components not shown, fewer components than shown, or different combinations, configurations, or quantities of the components shown. For example, although three edge servers 120A, 120B, and 120N are shown for purposes of example and illustration, it is contemplated that different quantities and configurations of edge servers may be used. Additionally, although three client devices 180A, 180B, and 180N are shown for purposes of example and illustration, it is contemplated that different quantities and configurations of client devices may be used.

In some embodiments, origin server(s) 110, edge servers 120A-120N, and/or client devices 180A-180N may be implemented using virtual compute instances and/or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 9.

In one embodiment, a suitable component of the CDN 100 may select and/or provision virtual compute instances for implementing the various servers or other components of the CDN (origin server(s) 110, edge servers 120A-120N, and/or their constituent modules). For example, the virtual compute instances may be provisioned from a suitable pool of available computing instances. In one embodiment, additional computing instances may be added to the CDN 100 as needed. In one embodiment, computing instances may be returned to the pool of available computing instances if the computing instances are not needed at a particular point in time.

In one embodiment, the functionality of the CDN 100 may be provided to customers using a provider network. The customers of the CDN 100 may represent entities (e.g., persons, businesses, and/or other organizations) that seek to have the CDN deliver content (e.g., content supplied or selected by the customers) to the client devices 180A-180N. For example, the functionality of the CDN 100 may be presented to customers as a web-accessible service. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including computer servers, storage devices, network devices, and the like.

Figure 2:
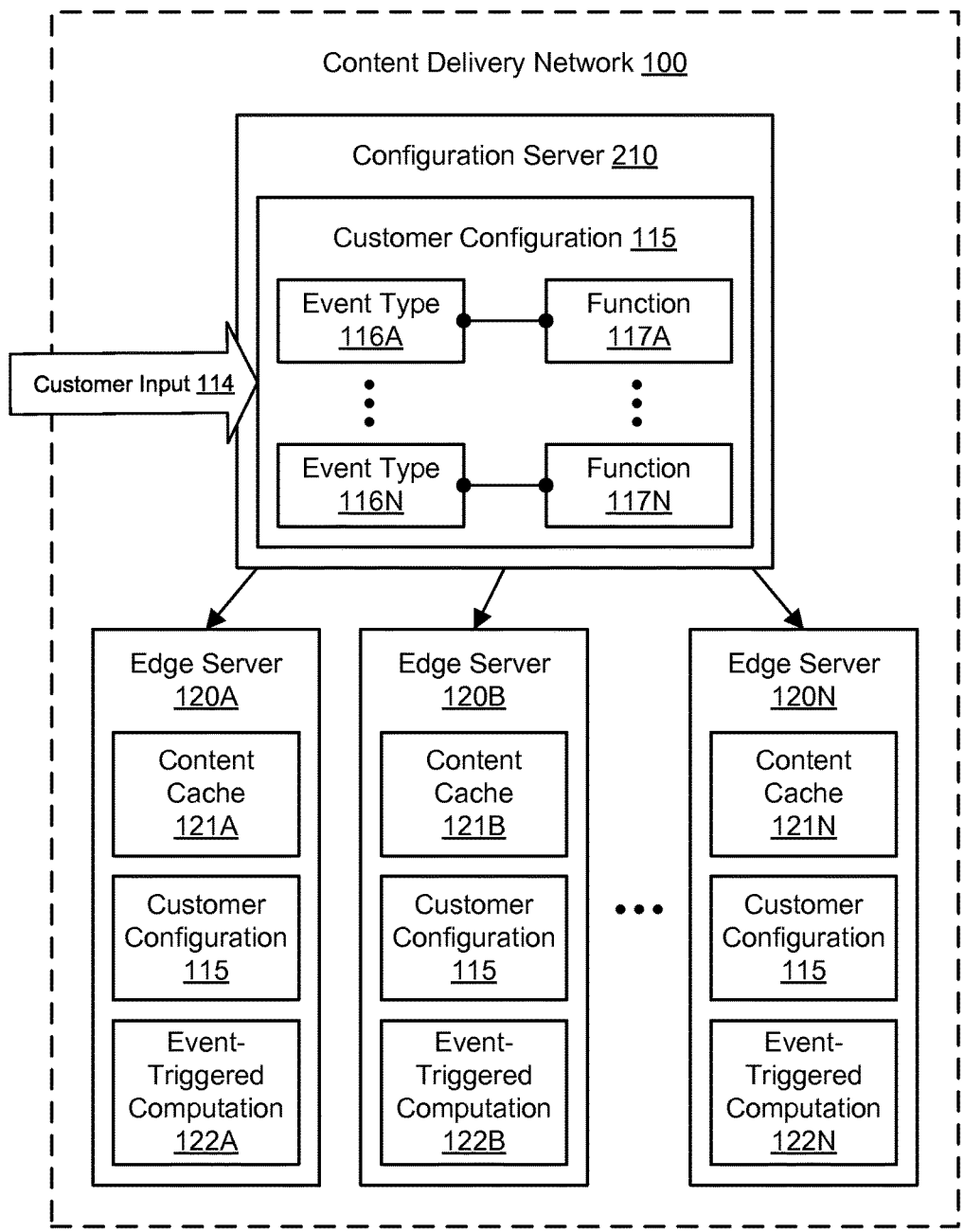
FIG. 2 illustrates further aspects of the example system environment for customizable event-triggered computation at edge locations, including customer-specified functions associated with events, according to one embodiment.

FIG. 2 illustrates further aspects of the example system environment for customizable event-triggered computation at edge locations, including customer-specified functions associated with events, according to one embodiment. The event-triggered computation at the edge servers 120A-120N may be customized by one or more customers or other users of the CDN 100. In one embodiment, customer input 114 may be used to specify, define, or otherwise determine (at least in part) a customer configuration 115 for performing the event-triggered computation. As discussed above, customers of the CDN 100 may represent entities (e.g., persons, businesses, and/or other organizations) that seek to have the CDN deliver content (e.g., content supplied or selected by the customers) to the client devices 180A-180N, such that content may be said to be delivered to clients on behalf of a customer. The customer input 114 may represent input provided by a particular customer of the CDN 100, and the customer configuration 115 may represent a configuration for that customer. In one embodiment, additional customer configurations maintained by the configuration server 210 may include additional configurations for additional customers. In one embodiment, the customer configuration 115 may relate to a particular application or dataset for the particular customer, and the particular customer may specify additional customer configurations for additional applications or additional datasets. Accordingly, the customer configuration 115 may represent an event-triggered computation policy for a particular customer (and potentially for a particular application or particular dataset for that customer).

The customer input 114 may be provided by the customer using any suitable interface(s), such as an application programming interface (API) and/or graphical user interface (GUI). For example, a GUI for modifying the customer configuration 115 may be presented using controls in a web page, and a customer may use a web browser to access the web page to modify the customer configuration. The customer input 114 may be provided to a centralized component such as a configuration server 210 to specify the customer configuration 115. The customer configuration 115 may then be propagated to the edge servers 120A-120N from the configuration server 210. Updates to the customer configuration 115 (e.g., based on additional customer input) may also be made at the configuration server 210 and then pushed to the edge servers 120A-120N. In this manner, the same event-triggered computation policy may be implemented for a particular customer (and potentially for a particular application or particular dataset for that customer) across a plurality of edge servers, such as edge servers 120A-120N. The configuration server 210 may be positioned in any suitable location with respect to the edge servers 120A-120N and may be implemented by the example computing device 3000 illustrated in FIG. 9.

In one embodiment, the customer configuration 115 may associate or link various event types with various functions. As shown in the example of FIG. 2, the customer configuration 115 may specify an associated function for any of a plurality of event types 116A-116N. For example, based on customer input 114, event type 116A may be associated with function 117A, and event type 116N may be associated with function 117N. Although event types 116A-116N and functions 117A-117N are shown for purposes of illustration and example, it is contemplated that any suitable number and configuration of event types and functions may be used with the customer configuration 115. In one embodiment, a particular event type may not have an associated function. The event types 116A-116N may generally relate to events that may be encountered during the preparation and/or delivery of content from one of the edge servers 120A-120N to one of the client devices 180-180N. Examples of event types are discussed below with respect to FIG. 3.

The functions 117A-117N and their associations with the corresponding event types 116A-116N may be specified by the customer, e.g., using the customer input 114. In one embodiment, the functions 117A-117N may be uploaded to the configuration server 210 by the customer. In one embodiment, the functions 117A-117N may be selected by the customer from a set of predefined functions; at least some of the predefined functions may be provided by the customer and/or additional customers. The functions 117A-117N may comprise sets of program code (including program instructions) that can be executed using any suitable execution techniques (including the use of interpretation, compilation, and/or just-in-time compilation) on the edge servers 120A-120N. Accordingly, the functions 117A-117N may be specified by the customer in any suitable format, including a scripting language, a high-level programming language, compiled program code, or any other suitable format or combinations of formats. In one embodiment, one or more of the functions 117A-117N may refer to a read-only data store as a source of input. The read-only data store may be specified by the same customer and may be propagated to the edge servers 120A-120N for use with the functions 117A-117N.

Figure 3:
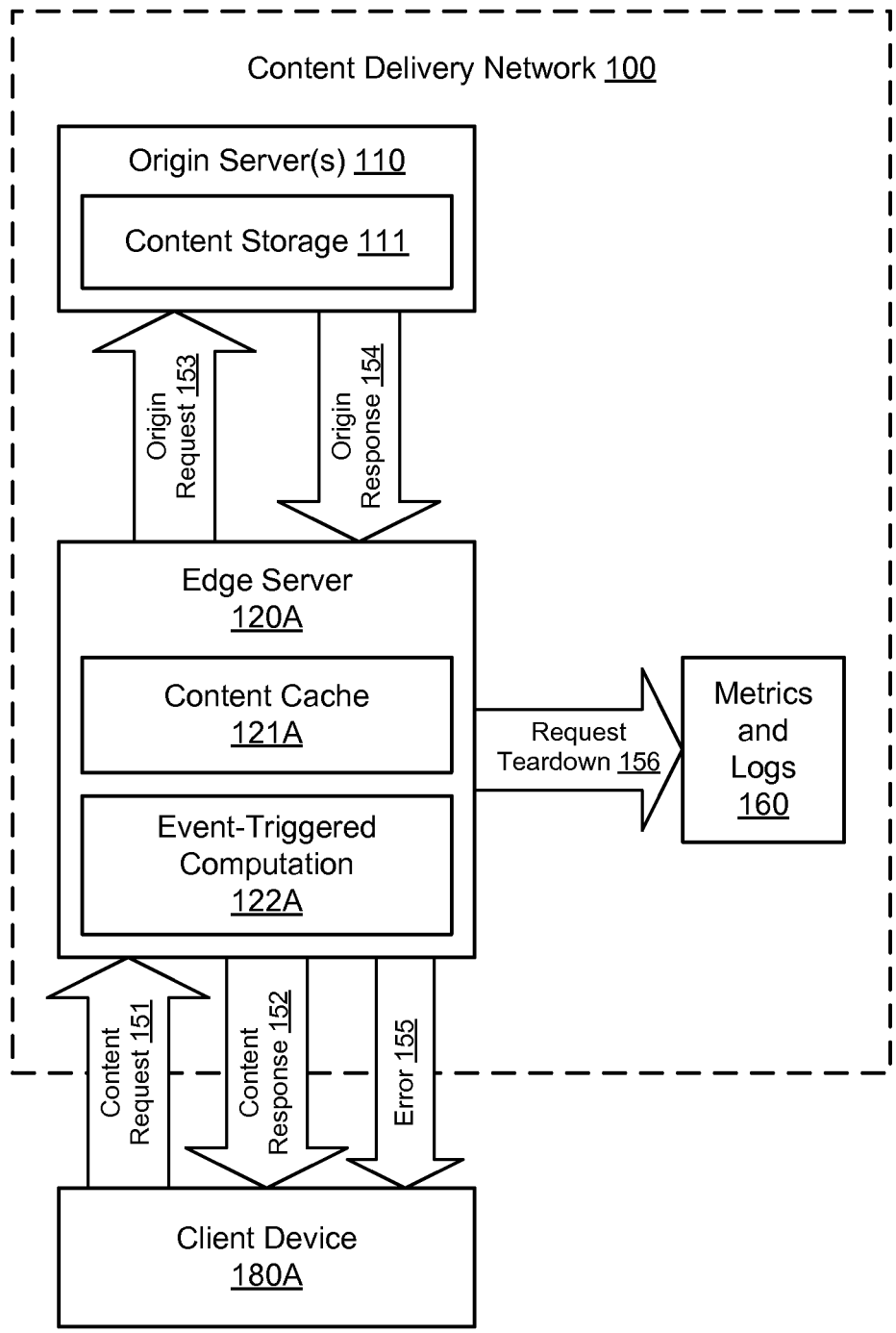
FIG. 3 illustrates further aspects of the example system environment for customizable event-triggered computation at edge locations, including examples of events for triggering computation, according to one embodiment.

FIG. 3 illustrates further aspects of the example system environment for customizable event-triggered computation at edge locations, including examples of events for triggering computation, according to one embodiment. In one embodiment, the event types 116A-116N may include events related to content delivery such as a content request 151, a content response 152 (e.g., a response to the content request 151), an origin request 153, an origin response 154 (e.g., a response to the origin request 153), an error notification 155, and/or a request teardown 156. In one embodiment, one or more of these events may be associated with a particular function by a particular customer, and the particular function may be executed at or after the time of the corresponding event to customize content delivery for that customer. One or more of the events 151-156 may be encountered during the processing of a content request from a client device 180A (including the generation and/or retrieval of the content and the delivery of the content). In some circumstances, not all of the events 151-156 may be encountered in the processing of a particular request for content.

In one embodiment, execution of a function at an edge server may include accessing a resource that is local to the edge server, such as a service or storage resource. In one embodiment, execution of a function may include accessing a resource of a provider network, e.g., using a network to access a server other than the edge servers 120A-120N and origin server(s) 110. For example, accessible resources of the provider network may include virtualized computing resources, virtualized storage resources, and various services configured to perform various tasks.

The content request event 151 may occur when a request for content is received by the edge server 120A from the client device 180A. The content request event 151 may occur when the request headers for the content request (e.g., for a CACHE or PROXY request) are received from the client device 180A. Any suitable function may be performed by the edge server 120A in response to the content request event 151. For example, a function associated with the content request event 151 may be performed (e.g., executed) to modify the content request itself. For example, a function associated with the content request event 151 may be performed (e.g., executed) to change the routing of the content request, change the protocol of the content request, and/or modify a header for the origin request. In one embodiment, a function associated with the content request event 151 may be performed (e.g., executed) to dynamically generate a response to the content request without retrieving content from the content cache 121A or origin server(s) 110.

The content response event 152 may occur when content responsive to a request for content is sent to the client device 180A that issued the request. Any suitable function may be performed by the edge server 120A in response to the content response event 152. For example, a function associated with the content response event 152 may be performed (e.g., executed) to modify the content response itself.

The origin request event 153 may occur when the edge server 120A is preparing to request content from the origin server(s) 110. For example, an origin request may be issued to obtain content from the origin server(s) 110 when the content is not found in the content cache 121A. Accordingly, the origin request event 153 may not be encountered if the requested content is found in the content cache 121A. Any suitable function may be performed by the edge server 120A in response to the origin request event 153. A function associated with the origin request event 153 may be performed (e.g., executed) to modify the origin request itself. For example, a function associated with the origin request event 153 may be performed (e.g., executed) to change the routing of the origin request, change the protocol of the origin request, and/or add an authorization header to the origin request. In one embodiment, a function associated with the origin request event 153 may be performed (e.g., executed) to dynamically generate a response to the origin request without retrieving content from the content cache 121A or origin server(s) 110.

The origin response event 154 may occur when content responsive to an origin request is received by the edge server 120A from the origin server(s) 110. Again, the origin response event 155 may not be encountered if the requested content is found in the content cache 121A. In one embodiment, the origin response event 154 may occur when the content is received by the edge server 120A but before the content is placed in the content cache 121A. Any suitable function may be performed by the edge server 120A in response to the origin response event 154. For example, a function associated with the origin response event 154 may be performed (e.g., executed) to modify the origin response itself.

The error event 155 may occur when an error is generated or encountered at any suitable point during the processing of the content request 151. For example, an error may be generated if the requested content cannot be delivered to the client device 180A. Any suitable function may be performed by the edge server 120A in response to the error event 155. For example, a function associated with the error event 155 may be performed (e.g., executed) to fetch, modify, or otherwise generate an error page or other error notification, e.g., an error that is sent to the client device 180A.

The request teardown event 156 may occur after the content response 152 or error 155. The request teardown 156 may generate one or more performance metrics and or log entries related to processing a request for content. Any suitable function may be performed by the edge server 120A in response to the request teardown event 156. For example, a function associated with the request teardown event 156 may be performed (e.g., executed) to generate one or more metrics and/or log entries and store them in a repository of metrics and logs 160.

Figure 4:
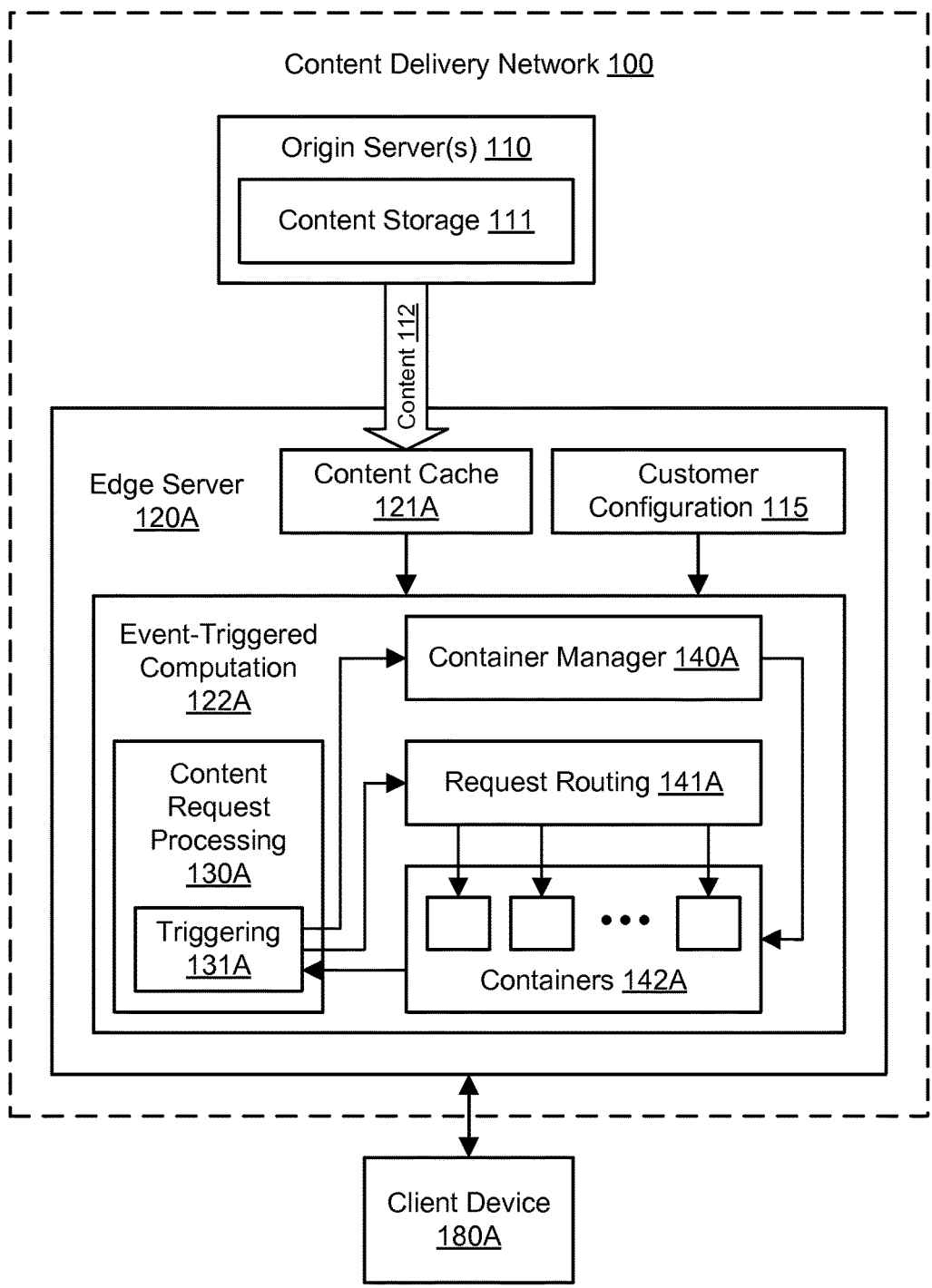
FIG. 4 illustrates further aspects of the example system environment for customizable event-triggered computation at edge locations, including secure execution of event-triggered functions at an edge server, according to one embodiment.

FIG. 4 illustrates further aspects of the example system environment for customizable event-triggered computation at edge locations, including secure execution of event-triggered functions at an edge server, according to one embodiment. The event-triggered computation functionality 122A may perform (e.g., execute) functions to customize content delivery in a secure manner, e.g., using one or more techniques for process isolation. As used herein, the term "process isolation" generally includes the isolation of processing of functions from each other such that a first function cannot directly affect or access a second function (or data associated with the second function). In one embodiment, any of the edge servers 120A-120N may implement a secure execution environment that includes one or more components for executing customer-specified functions using process isolation. Implementation of the secure execution environment to provide process isolation may permit the secure execution of arbitrary program code in customer-specified functions. At an edge server 120A, a content request processing module 130A may receive a request for content from a client device 180A. As discussed above, one or more content delivery events (such as events 151-156) may be encountered in processing the request for content. For example, processing the request may include the edge server 120A requesting content 112 from the origin server(s) 110 if the content is not already stored in the content cache 121A. When an event is encountered that is associated with a function in the customer configuration 115, a triggering module 131A at the edge server 120A may initiate execution of that function.

The event-triggered computation 122A may reference the customer configuration 115 to determine the associations between events and functions. In one embodiment, each function may be executed in its own isolated container after being triggered by the corresponding event. The edge server 120A may include a plurality of containers 142A. The containers 142A may provide process isolation for execution of a plurality of functions. Each of the containers 142A may implement a secure execution environment for execution of functions associated with content delivery events. Any suitable technologies may be used to implement the containers 142A. In one embodiment, any of the containers 142A may implement a virtual machine in which a function can be performed. Any suitable virtual machine technologies may be used to implement the containers 142A. In one embodiment, any of the containers 142A may implement a Linux container in which a function can be performed. Each Linux container may provide a virtual environment that includes its own computational, memory, input/output, and network resources. The containers 142A collectively may be used for execution of functions for one customer or for multiple customers. It is contemplated that any of the containers 142A, when in use, may be used to execute a function for one particular customer at any given time.

The containers 142A may be managed by a container manager module 140A. For example, the container manager 140A may instantiate containers, recycle or reset containers, destroy containers, and perform any other suitable tasks to manage the containers 142A. The triggering module 131A may send control messages to the container manager 140A, e.g., to instruct the container manager 140A to instantiate or otherwise prepare a container for execution of a particular function. The triggering module 131A may send function execution messages to a request routing module 141A, and the request routing module 141A may forward those messages to appropriate containers to initiate execution of particular functions. In one embodiment, containers for particular functions may be instantiated prior to the corresponding events being encountered, and the request routing module 141A may route execution requests to those preconfigured containers when the corresponding events are triggered. In one embodiment, containers for particular functions may be instantiated after the corresponding events are encountered, and the request routing module 141A may route execution requests to those containers when the corresponding events are triggered. Results of the execution of functions in the containers may be routed back to the content request processing module 130A in any suitable manner, e.g., directly from the containers 142A to the content request processing module or triggering module 131A.

Figure 5:
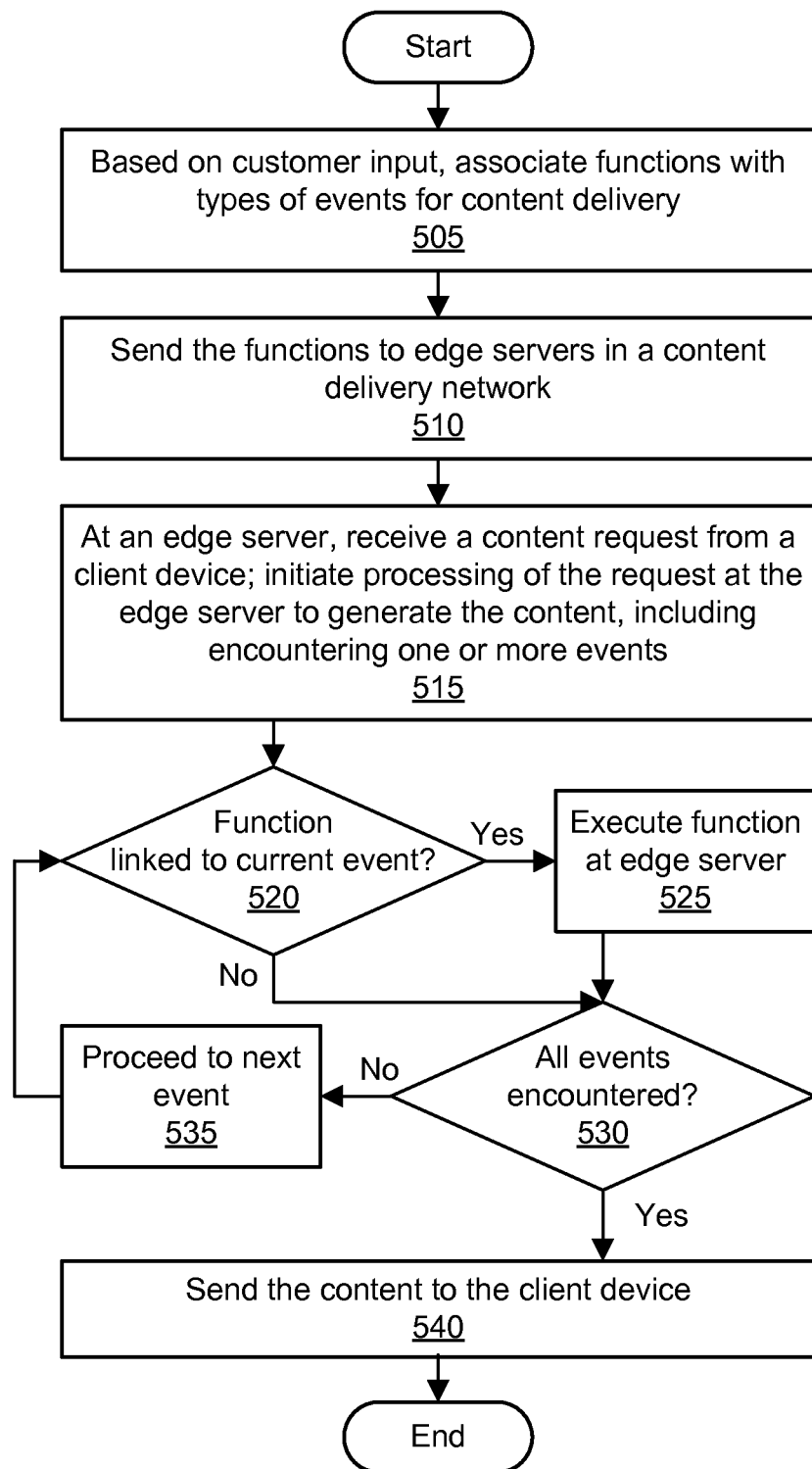
FIG. 5 is a flowchart illustrating a method for customizable event-triggered computation at edge locations, according to one embodiment.

FIG. 5 is a flowchart illustrating a method for customizable event-triggered computation at edge locations, according to one embodiment. As shown in 505, functions may be associated with types of events for content delivery. The functions may be associated with events based on customer input from one or more customers of a content delivery network (CDN). The functions may be specified by the customer(s) or selected by the customer(s) from a set of available functions. The functions may generally include sets of program code (including program instructions) that can be executed or otherwise performed in the processing of a request for content from the CDN (including the generation or retrieval of the content and the delivery of the content). The events may include events related to content delivery such as a content request, a content response (e.g., a response to the content request), an origin request, an origin response (e.g., a response to the origin request), an error notification, and/or a request teardown. In one embodiment, a read-only data store may also be specified (e.g., based on customer input).

As shown in 510, the customer-specified functions may be sent to a plurality of edge servers in the CDN. In one embodiment, the functions may be specified for the events in a centralized location, such as a configuration server, before being propagated to the edge servers. Sending the functions to the edge servers may also include sending the associations between the functions and the corresponding event types. In one embodiment, the read-only data store may also be propagated to the edge servers.

As shown in 515, a content request may be received at an edge server from a client device. The request may represent a request for content from a content cache at the edge server or from an origin server. The edge server may initiate processing of the request to generate the content, and the processing may include encountering one or more events. As shown in 520 through 535, the edge server may iterate through the various events and perform any associated functions. In this manner, the content may be generated based (at least in part) on execution of one or more customer-specified functions that are triggered by events. As shown in 520, the edge server may determine whether a function is linked to the current event (e.g., as specified by a customer). If so, then as shown in 525, function may be executed or otherwise performed at the edge server. In one embodiment, the function may be executed in a container using process isolation such that the container may be isolated from additional functions executing in additional containers. Execution of the function may include retrieving and using one or more elements from the read-only data store replicated to edge servers. As shown in 530, it may be determined whether all events associated with the processing of the request have been encountered. If not, then as shown in 535, the method may proceed to the next event. Once all the events have been encountered, as shown in 540, the edge server may send the content to the client device.

The CDN discussed herein may implement techniques for multi-tenancy so that customer-specified functions for different customers may be triggered by different events on the same edge server. In one embodiment, an additional request for additional content may be received at the edge server. The additional request may represent a request for content from a different customer, e.g., from a content cache at the edge server or from an origin server. The edge server may initiate processing of the additional request to generate the content, and the processing may include encountering one or more events. As discussed above with respect to 520 through 535, the edge server may iterate through the various events and perform any associated functions. In this manner, the additional content may be generated based (at least in part) on execution of one or more event-triggered functions that are specified by a different customer. Once all the events have been encountered, the edge server may send the additional content to the client device.

Figure 6:
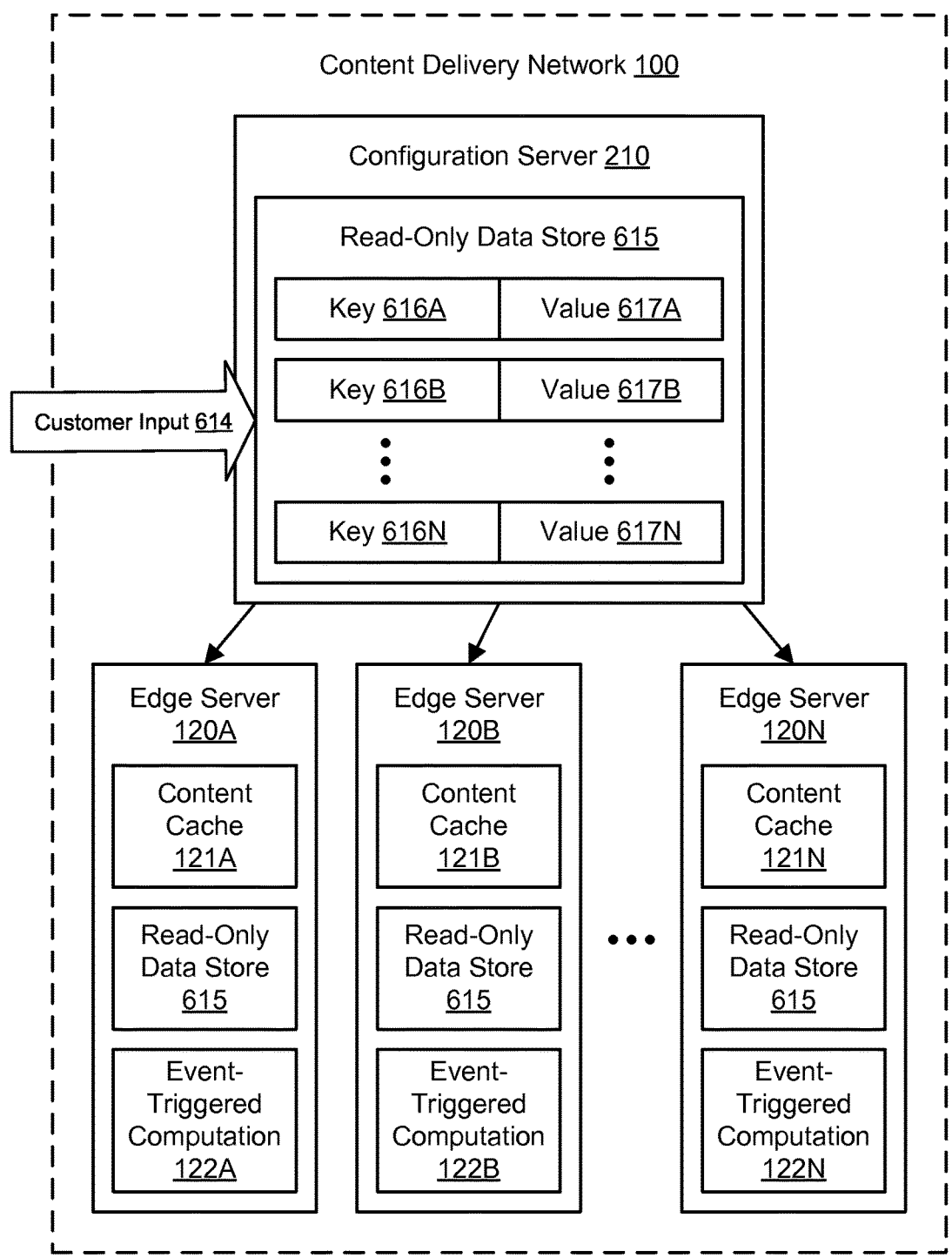
FIG. 6 illustrates further aspects of the example system environment for customizable event-triggered computation at edge locations, including replication of a read-only data store to edge locations, according to one embodiment.

FIG. 6 illustrates further aspects of the example system environment for customizable event-triggered computation at edge locations, including replication of a read-only data store to edge locations, according to one embodiment. The event-triggered computation at the edge servers 120A-120N may be customized by one or more customers or other users of the CDN 100. In one embodiment, customer input 614 may be used to specify, define, or otherwise determine (at least in part) a read-only data store 615 usable for performing the event-triggered computation. As discussed above, customers of the CDN 100 may represent entities (e.g., persons, businesses, and/or other organizations) that seek to have the CDN deliver content (e.g., content supplied or selected by the customers) to the client devices 180A-180N, such that content may be said to be delivered to clients on behalf of a customer. The customer input 614 may represent input provided by a particular customer of the CDN 100, and the read-only data store 615 may represent a data store for that particular customer. In one embodiment, additional read-only data stores may be maintained by the configuration server 210 for the same customer and/or for additional customers. In one embodiment, the read-only data store 615 may relate to a particular application or dataset for the particular customer, and the particular customer may specify additional read-only data stores for additional applications or additional datasets.

The customer input 614 may be provided by the customer using any suitable interface(s), such as an application programming interface (API) and/or graphical user interface (GUI). For example, a customer may upload elements of data for the read-only data store 615 using a suitable API to the configuration server 210, thereby populating the read-only data store 615. The customer input 614 may be provided to a centralized component such as the configuration server 210 to specify elements of the read-only data store 615. The read-only data store 615 may then be propagated to the edge servers 120A-120N from the configuration server 210. Updates to the read-only data store 615 (e.g., based on additional customer input) may also be made at the configuration server 210 and then pushed to the edge servers 120A-120N. In this manner, the event-triggered computation using the same read-only data store 615 may be implemented for a particular customer (and potentially for a particular application or particular dataset for that customer) across a plurality of edge servers, such as edge servers 120A-120N. The configuration server 210 may be positioned in any suitable location with respect to the edge servers 120A-120N and may be implemented by the example computing device 3000 illustrated in FIG. 9.

Any suitable storage technologies may be used to implement the read-only data store 615. In one embodiment, the read-only data store 615 may be a key-value data store that stores a plurality of key-value pairs. As shown in the example of FIG. 6, the elements of data in the read-only data store 615 may include a key 616A and an associated value 617A, a key 616B and an associated value 617B, and a key 616N and an associated value 617N. However, it is contemplated that any suitable number and configuration of data elements may be maintained using the read-only data store 615. In one embodiment, one or more of the functions specified by a customer may refer to the read-only data store 615 as a source of input. The read-only data store and functions may be specified by the same customer, and both may be propagated to the edge servers 120A-120N.

Figure 7:
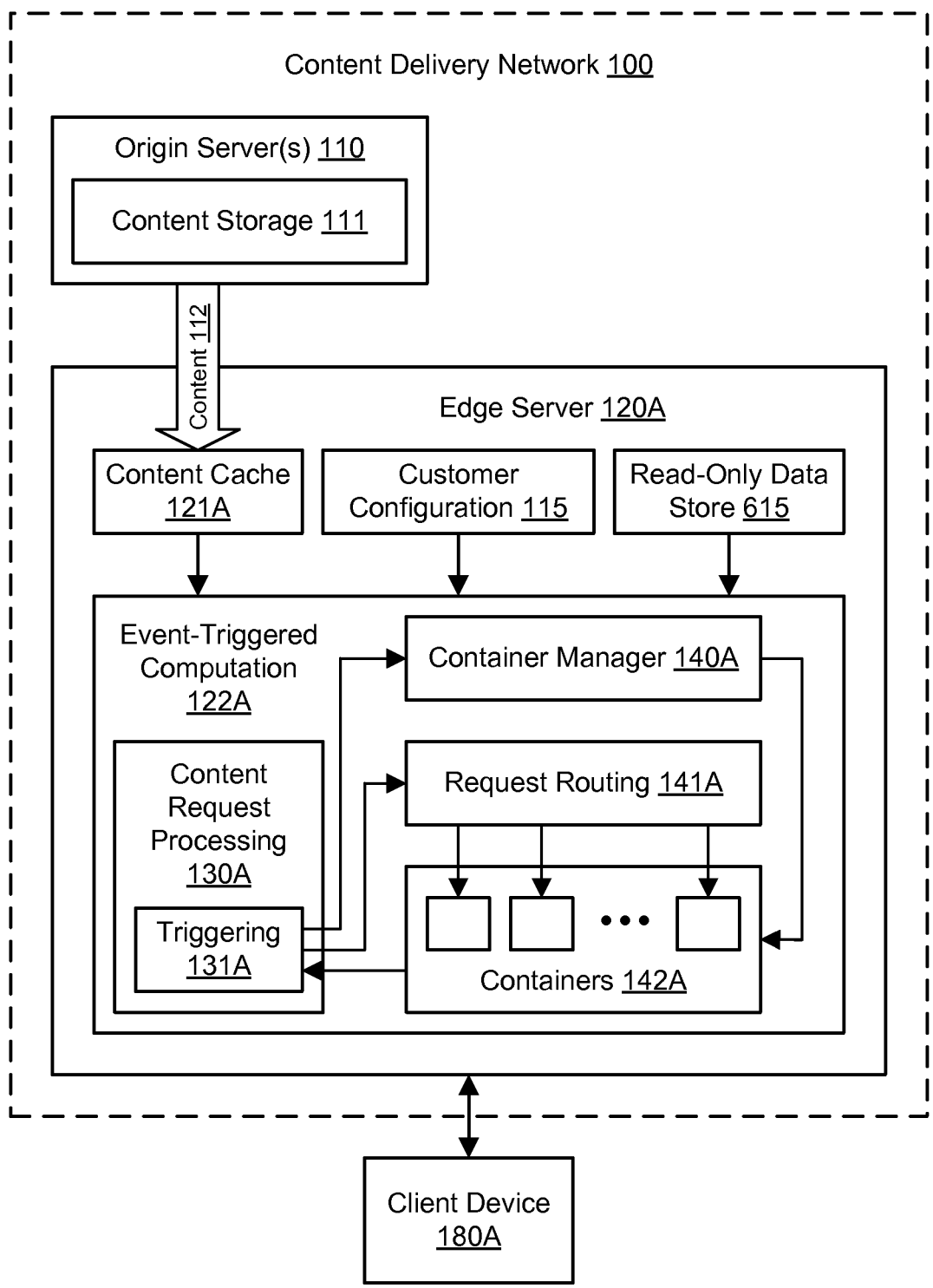
FIG. 7 illustrates further aspects of the example system environment for customizable event-triggered computation at edge locations, including secure execution of event-triggered functions at an edge server using a replicated read-only data store, according to one embodiment.

FIG. 7 illustrates further aspects of the example system environment for customizable event-triggered computation at edge locations, including secure execution of event-triggered functions at an edge server using a replicated read-only data store, according to one embodiment. The event-triggered computation functionality 122A may perform (e.g., execute) functions to customize content delivery in a secure manner, e.g., using one or more techniques for process isolation. As used herein, the term "process isolation" generally includes the isolation of processing of functions from each other such that a first function cannot directly affect or access a second function (or data associated with the second function). In one embodiment, any of the edge servers 120A-120N may implement a secure execution environment that includes one or more components for executing customer-specified functions using process isolation. At an edge server 120A, a content request processing module 130A may receive a request for content from a client device 180A. As discussed above, one or more content delivery events (such as events 151-156) may be encountered in processing the request for content. For example, processing the request may include the edge server 120A requesting content 112 from the origin server(s) 110 if the content is not already stored in the content cache 121A. When an event is encountered that is associated with a function in the customer configuration 115, a triggering module 131A at the edge server 120A may initiate execution of that function. Execution of the function may include retrieving and using one or more elements of data from the read-only data store 615, e.g., one or more values associated with one or more keys. The content that is generated and sent to the requesting device 180A may thus include or otherwise be based (at least in part) on elements of data from the read-only data store 615.

The event-triggered computation 122A may reference the customer configuration 115 to determine the associations between events and functions. In one embodiment, each function may be executed in its own isolated container after being triggered by the corresponding event. The edge server 120A may include a plurality of containers 142A. The containers 142A may provide process isolation for execution of a plurality of functions. Each of the containers 142A may implement a secure execution environment for execution of functions associated with content delivery events. Any suitable technologies may be used to implement the containers 142A. In one embodiment, any of the containers 142A may implement a virtual machine in which a function can be performed. Any suitable virtual machine technologies may be used to implement the containers 142A. In one embodiment, any of the containers 142A may implement a Linux container in which a function can be performed. Each Linux container may provide a virtual environment that includes its own computational, memory, input/output, and network resources. The containers 142A collectively may be used for execution of functions for one customer or for multiple customers. It is contemplated that any of the containers 142A, when in use, may be used to execute a function for one particular customer at any given time.

The containers 142A may be managed by a container manager module 140A. For example, the container manager 140A may instantiate containers, recycle or reset containers, destroy containers, and perform any other suitable tasks to manage the containers 142A. The triggering module 131A may send control messages to the container manager 140A, e.g., to instruct the container manager 140A to instantiate or otherwise prepare a container for execution of a particular function. The triggering module 131A may send function execution messages to a request routing module 141A, and the request routing module 141A may forward those messages to appropriate containers to initiate execution of particular functions. In one embodiment, containers for particular functions may be instantiated prior to the corresponding events being encountered, and the request routing module 141A may route execution requests to those preconfigured containers when the corresponding events are triggered. In one embodiment, containers for particular functions may be instantiated after the corresponding events are encountered, and the request routing module 141A may route execution requests to those containers when the corresponding events are triggered. Results of the execution of functions in the containers may be routed back to the content request processing module 130A in any suitable manner, e.g., directly from the containers 142A to the content request processing module or triggering module 131A.

Figure 8:
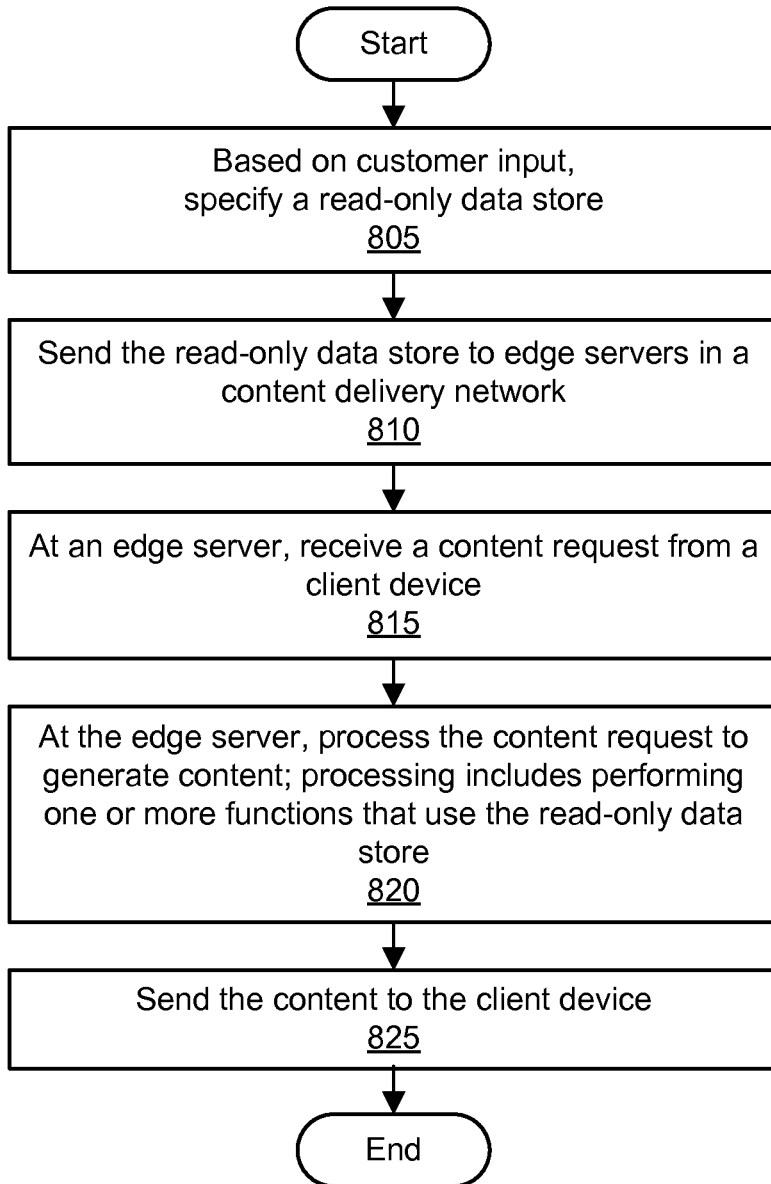
FIG. 8 is a flowchart illustrating a method for replication of a read-only data store to edge locations, according to one embodiment.

FIG. 8 is a flowchart illustrating a method for replication of a read-only data store to edge locations, according to one embodiment. As shown in 805, a read-only data store may be specified. The data store may be specified by a customer of a content delivery network (CDN), e.g., by the customer uploading elements of data for the data store and/or selected elements of data from a set of available elements. The data store may include a plurality of key-value pairs. In one embodiment, the customer may also specify one or more functions that are associated with events. The functions may generally include sets of program code (including program instructions) that can be executed or otherwise performed in the processing of a request for content from the CDN (including the generation or retrieval of the content and the delivery of the content). The events may include events related to content delivery such as a content request, a content response (e.g., a response to the content request), an origin request, an origin response (e.g., a response to the origin request), an error notification, and/or a request teardown.

As shown in 810, the read-only data store may be sent to a plurality of edge servers in the CDN. Each of the edge servers may maintain a local copy of the data store in storage resources managed by the edge server, potentially including off-server storage. The read-only data store may be specified in a centralized location, such as a configuration server, before being propagated to the edge servers. Sending the read-only data store to the edge servers may include sending data to the edge servers for populating local copies or instances of the read-only data store. In one embodiment, the customer-specified function(s) may also be sent to the plurality of edge servers in the CDN. Sending the functions to the edge servers may also include sending the associations between the functions and the corresponding event types.

As shown in 815, a content request may be received at an edge server from a client device. The request may represent a request for content from a content cache at the edge server or from an origin server. As shown in 820, the edge server may initiate processing of the request to generate the content, and the processing may include performing one or more functions. To generate the requested content, the one or more functions may retrieve and use elements of data from the read-only data store at the edge server. In one embodiment, the one or more functions may include parameters that reference data from the local copy of the read-only data store as an input. In processing the content request, one or more events may be encountered. Particular functions may be associated with particular events, such that each of the functions (e.g., as specified by the customer who also specified the read-only data store) may be performed when the corresponding event is encountered in the processing of the content request. Performing a function at an edge server may include retrieving and using data from the local copy of the read-only data store. As shown in 825, the edge server may send the content to the client device.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices comprising one or more hardware processors and memory and configured to implement a content delivery network comprising an origin server and an edge server, wherein the edge server comprises a content cache configured to store content retrieved from the origin server, and wherein the edge server is configured to:
receive, by the edge server, a customer configuration, the customer configuration based on input previously received by the content delivery network from the customer via a user interface provided by the content delivery network, the input comprising:
selection, by the customer via the user interface, of a function from among one or more predefined functions at the content delivery network that are available for the selection by the customer, wherein the predefined functions comprise user-defined program code previously uploaded to the content delivery network by the customer to be available for selection as a predefined function; and
specification, by the customer via the user interface, of an association of the function with an event that is available as a pre-defined event at the content delivery for association with one of the pre-defined functions, wherein the predefined event is to be encountered during processing of a given request for content at the content delivery network;

receive, from a client device by the edge server, a request for content from the content cache or from the origin server;

initiate processing of the request, wherein the processing of the request comprises encountering the event associated with the function;

in response to encountering the event associated with the function:

instantiate a container at the edge server, wherein the container is dedicated for use by the function associated with the event; and execute, at the edge server, the function associated with the event in an execution environment of the container using process isolation with respect to execution of one or more other functions at the edge server, wherein the one or more other functions are executed in one or more other respective containers instantiated at the same edge server in response to another respective event;

generate the content based at least in part on execution of the function; and send the content to the client device.

2. The system as recited in claim 1, wherein the event comprises receipt of the request for content from the client device or preparation of a request for content from the origin server, and wherein, in executing the function associated with the event, the edge server is configured to:

modify the request for content from the content cache or the request for content from the origin server.

3. The system as recited in claim 1, wherein the event comprises generation of a response to the request for content from the content cache or receipt of a response to a request for content from the origin server, and wherein, in executing the function associated with the event, the edge server is configured to:

modify a response to the request for content from the content cache or the response to the request for content from the origin server.

4. The system as recited in claim 1, wherein the content is generated based at least in part on execution of the function without retrieving the content from the content cache or from the origin server.

5. A computer-implemented method, comprising:

receiving, by an edge server of a content delivery network, a customer configuration, the customer configuration based on input previously received by the content delivery network from the customer via a user interface provided by the content delivery network, the input comprising:

selection, by the customer via the user interface, of a function from among one or more predefined functions at the content delivery network that are available for the selection by the customer, wherein the predefined functions comprise user-defined program code previously uploaded to the content delivery network by the customer to be available for selection as a predefined function; and specification, by the customer via the user interface, of an association of the function with an event that is available as a pre-defined event at the content delivery network for association with one of the pre-defined functions, wherein the predefined event is to be encountered during processing of a given request for content at the content delivery network;

receiving, at the edge server, a request for content, wherein the request is received from a client device;

initiating processing of the request, wherein the processing of the request comprises encountering the event associated with the function;

in response to encountering the event associated with the function:

instantiating a container at the edge server, wherein the container is dedicated for use by the function associated with the event; and performing, at the edge server, the function associated with the event in an execution environment of the container, wherein performing the function is isolated with respect to performing one or more other functions at the edge server, wherein the one or more other functions are performed in one or more other respective containers instantiated at the same edge server in response to another respective event;

generating the content based at least in part on performing the function; and sending the content from the edge server to the client device.

6. The method as recited in claim 5, wherein the event comprises receipt of the request for content from the client device or preparation of a request for content from an origin server, and wherein performing the function associated with the event comprises:

modifying the request for content from a content cache at the edge server or the request for content from the origin server.

7. The method as recited in claim 5, wherein the event comprises generation of a response to the request for content from a content cache at the edge server or receipt of a response to a request for content from an origin server, and wherein performing the function associated with the event comprises:

modifying a response to the request for content from the content cache or the response to the request for content from the origin server.

8. The method as recited in claim 5, wherein performing the function associated with the event comprises:

generating one or more metrics or log entries associated with processing the request.

9. The method as recited in claim 5, wherein the content is generated based at least in part on performing the function without retrieving the content from a content cache at the edge server or from an origin server.

10. The method as recited in claim 5, wherein the one or more other functions performed in the one or more other respective containers instantiated at the same edge server respectively comprise other user-defined program code previously uploaded to the content delivery network and selected by the same customer.

11. The method as recited in claim 10, wherein the container comprises a virtual machine, and wherein the one or more other containers comprise one or more other virtual machines.

12. The method as recited in claim 5, wherein performing the function associated with the event comprises:

accessing a resource of a provider network at an additional server.

13. The method as recited in claim 5, further comprising:

receiving, at the edge server, an additional request for additional content;

initiating processing of the additional request, wherein the processing of the additional request comprises encountering an additional event, and wherein the additional event is associated with a different function specified by a different customer;
performing, at the edge server, the different function associated with the additional event, wherein performing the different function is isolated with respect to execution of the function at the edge server; and
generating the additional content based at least in part on performing the different function.

14. A non-transitory computer-readable storage device storing program instructions computer-executable to perform:
receiving, by an edge server of a content delivery network, a customer configuration, the customer configuration based on input previously received by the content delivery network from the customer via a user interface provided by the content delivery network, the input comprising:
selection, by the customer via the user interface, of a function from among one or more predefined functions at the content delivery network that are available for the selection by the customer, wherein the predefined functions comprise user-defined program code previously uploaded to the content delivery network by the customer to be available for selection as a predefined function; and
specification, by the customer via the user interface, of an association of the function with an event that is available as a pre-defined event at the content delivery for association with one of the pre-defined functions, wherein the predefined event is to be encountered during processing of a given request for content at the content delivery network;
receiving, at the edge server, a request for content, wherein the request is received from a client device;
initiating processing of the request, wherein the processing of the request comprises encountering the event associated with the function;
in response to encountering the event associated with the function:
instantiating a container at the edge server, wherein the container is dedicated for use by the function associated with the event; and
executing, at the edge server, the function associated with the event in an execution environment of the container, wherein the function is executed using an isolation technique with respect to execution of other functions at the edge server, wherein the other functions are executed in other respective containers instantiated at the same edge server in response to another respective event;
generating the content based at least in part on execution of the function; and
sending the content from the edge server to the client device.

15. The non-transitory computer-readable storage device as recited in claim 14, wherein the event comprises receipt of the request for content from the client device or preparation of a request for content from an origin server, and wherein executing the user-defined program code associated with the event comprises:
modifying the request for content from a content cache at the edge server or the request for content from the origin server.

16. The non-transitory computer-readable storage device as recited in claim 14, wherein the event comprises generation of a response to the request for content from a content cache at the edge server or receipt of a response to a request for content from the origin server, and wherein executing the user-defined program code associated with the event comprises:
modifying a response to the request for content from the content cache or the response to the request for content from the origin server.

17. The non-transitory computer-readable storage device as recited in claim 14, wherein executing the user-defined program code associated with the event comprises:
generating one or more metrics or log entries associated with processing the request.

18. The non-transitory computer-readable storage device as recited in claim 14, wherein the content is generated based at least in part on execution of the user-defined program code without retrieving the content from a content cache at the edge server or from an origin server.

19. The non-transitory computer-readable storage device as recited in claim 14, wherein using the isolation technique comprises executing the user-defined program code in a container at the edge server and executing the other user-defined program code in one or more other containers at the edge server.

20. The non-transitory computer-readable storage device as recited in claim 14, wherein the program instructions are further computer-executable to perform:
receiving, at the edge server, an additional request for additional content;
initiating processing of the additional request, wherein the processing of the additional request comprises performing an additional event, and wherein the additional event is associated with different user-defined program code specified by a different user;
executing, at the edge server, the different user-defined program code associated with the additional event, wherein the different user-defined program code is executed using the isolation technique with respect to execution of the user-defined program code at the edge server; and
generating the additional content based at least in part on execution of the different user-defined program code.

* * * * *